US011975824B2

(12) United States Patent
Gharib et al.

(10) Patent No.: US 11,975,824 B2
(45) Date of Patent: *May 7, 2024

(54) SYSTEMS FOR FLIGHT CONTROL ON A MULTI-ROTOR AIRCRAFT

(71) Applicants: California Institute of Technology, Pasadena, CA (US); TooFon, Inc., Pasadena, CA (US)

(72) Inventors: Morteza Gharib, Altadena, CA (US); Michael V. Ol, Pasadena, CA (US); Christopher J. Dougherty, Pasadena, CA (US)

(73) Assignees: California Institute of Technology, Pasadena, CA (US); TooFon, Inc., Pasadena, CA (US)

( * ) Notice: Subject to any disclaimer, the term of this patent is extended or adjusted under 35 U.S.C. 154(b) by 124 days.

This patent is subject to a terminal disclaimer.

(21) Appl. No.: 17/236,945

(22) Filed: Apr. 21, 2021

(65) Prior Publication Data

US 2022/0185464 A1 Jun. 16, 2022

Related U.S. Application Data

(60) Provisional application No. 63/129,144, filed on Dec. 22, 2020, provisional application No. 63/124,614, filed on Dec. 11, 2020.

(51) Int. Cl.
*B64C 27/22* (2006.01)
*B64C 27/08* (2023.01)
(Continued)

(52) U.S. Cl.
CPC ............. *B64C 27/08* (2013.01); *B64C 27/22* (2013.01); *B64C 27/82* (2013.01); *B64C 39/024* (2013.01); *B64U 10/13* (2023.01)

(58) Field of Classification Search
CPC ....... B64C 11/001; B64C 11/46; B64C 27/20; B64C 27/22; B64C 27/32; B64C 27/82;
(Continued)

(56) References Cited

U.S. PATENT DOCUMENTS 3,179,353 A * 4/1965 Peterson ............. B64C 29/0025
244/12.3
4,880,071 A * 11/1989 Tracy ................. B64C 29/0033
244/12.3
(Continued)

FOREIGN PATENT DOCUMENTS

CN 109533306 A 3/2019
CN 112078784 A 12/2020
(Continued)

OTHER PUBLICATIONS

International Search Report and Written Opinion for International Application No. PCT/US2022/071201, Search completed Jun. 27, 2022, dated Jun. 30, 2022, 12 Pgs.
(Continued)

*Primary Examiner* — Richard Green
*Assistant Examiner* — Michael A. Fabula

(57) ABSTRACT

A system and method for controlling a multi-rotor aircraft that implements the unconventional use of an odd number of rotors. The odd or auxiliary rotor is designed to be smaller in diameter than the remaining main rotors and accordingly generates a smaller unbalanced torque and pitch on the aircraft. Additional configurations implement the use of smaller thrust rotors that can be used to generate thrust as well as control yaw and thus counteract any remaining unbalanced torque from the odd auxiliary rotor.

6 Claims, 6 Drawing Sheets

(51) Int. Cl.
  *B64C 27/82* (2006.01)
  *B64C 39/02* (2023.01)
  *B64U 10/13* (2023.01)

(58) Field of Classification Search
  CPC . B64C 29/00; B64C 29/0008; B64C 29/0016; B64C 29/0025; B64C 2027/8227; B64C 27/08; B64C 39/024; B64U 10/14; B64U 10/16; B64U 30/299; B64U 50/13; B64U 50/14; B64U 10/13
  See application file for complete search history.

(56) References Cited

U.S. PATENT DOCUMENTS

| | | | |
|---|---|---|---|
| 5,505,407 A * | 4/1996 | Chiappetta | B60F 5/02 244/50 |
| 5,971,320 A | 10/1999 | Jermyn | |
| 6,375,120 B1 * | 4/2002 | Wolnek | B64C 3/20 244/119 |
| 6,467,726 B1 * | 10/2002 | Hosoda | B64C 35/00 74/423 |
| 7,267,300 B2 * | 9/2007 | Heath | B64D 35/04 244/12.3 |
| 7,364,114 B2 * | 4/2008 | Wobben | B64C 39/022 244/17.11 |
| 7,857,254 B2 * | 12/2010 | Parks | B64C 29/0041 244/12.4 |
| 7,946,526 B2 | 5/2011 | Zimet | |
| 8,052,081 B2 | 11/2011 | Olm | |
| 8,376,266 B2 | 2/2013 | Gemmati | |
| 8,540,184 B2 | 9/2013 | Gemmati | |
| 9,051,050 B2 * | 6/2015 | Achtelik | B64D 47/08 |
| 9,623,969 B2 * | 4/2017 | Nelson | B64C 39/024 |
| 9,823,664 B2 * | 11/2017 | Krogh | G01S 17/89 |
| 9,975,624 B1 * | 5/2018 | Harvey | B64C 27/006 |
| 10,124,888 B2 | 11/2018 | Pounds | |
| 10,136,234 B2 | 11/2018 | Di Censo | |
| 10,315,759 B2 | 6/2019 | Nemovi | |
| D870,638 S * | 12/2019 | Kuanliang | D12/328 |
| 10,518,873 B2 | 12/2019 | Netzer | |
| 10,526,082 B2 * | 1/2020 | Su | B64C 29/0025 |
| 10,836,467 B2 | 11/2020 | Klein et al. | |
| 11,021,844 B2 | 6/2021 | Kim | |
| 11,072,423 B1 * | 7/2021 | Robertson | B64C 27/22 |
| 11,305,873 B2 * | 4/2022 | Zhang | B64C 35/002 |
| 11,731,759 B2 * | 8/2023 | Ol | B64C 27/32 244/17.23 |
| 2006/0192046 A1 * | 8/2006 | Heath | B64C 15/14 244/12.3 |
| 2006/0226281 A1 * | 10/2006 | Walton | B64C 27/20 244/17.23 |
| 2013/0092799 A1 | 4/2013 | Tian et al. | |
| 2014/0263822 A1 * | 9/2014 | Malveaux | B64C 39/024 244/17.23 |
| 2014/0312177 A1 | 10/2014 | Gaonjur | |
| 2015/0329204 A1 * | 11/2015 | Nelson | B64C 27/26 244/6 |
| 2016/0009387 A1 * | 1/2016 | Kummer | B64C 29/0066 244/6 |
| 2016/0101850 A1 * | 4/2016 | Lin | A63H 27/12 244/17.23 |
| 2016/0207625 A1 | 7/2016 | Judas et al. | |
| 2017/0349272 A1 * | 12/2017 | Laurent | B64C 29/0033 |
| 2018/0057163 A1 * | 3/2018 | Sababha | G05D 1/0816 |
| 2018/0141652 A1 | 5/2018 | Deslypper | |
| 2018/0244377 A1 * | 8/2018 | Chan | B64C 39/024 |
| 2019/0061933 A1 * | 2/2019 | Cappelleri | B64C 29/0025 |
| 2019/0101934 A1 | 4/2019 | Tuukkanen | |
| 2019/0106206 A1 | 4/2019 | Shi et al. | |
| 2019/0369057 A1 * | 12/2019 | Mattar | G01N 29/14 |
| 2020/0017204 A1 * | 1/2020 | Lacy | B64U 10/13 |
| 2020/0269980 A1 | 8/2020 | Fink et al. | |
| 2021/0070431 A1 | 3/2021 | Nakamats | |
| 2021/0284333 A1 * | 9/2021 | Windisch | B64C 25/62 |
| 2021/0371093 A1 | 12/2021 | Nakamats | |
| 2022/0185464 A1 | 6/2022 | Gharib | |
| 2022/0194573 A1 | 6/2022 | Nemovi | |
| 2022/0227489 A1 * | 7/2022 | Ol | B64C 29/02 |
| 2022/0297822 A1 | 9/2022 | Ol | |

FOREIGN PATENT DOCUMENTS

| | | |
|---|---|---|
| CN | 112357070 A | 2/2021 |
| DE | 102005003028 A1 | 7/2006 |
| EP | 4281366 A1 | 11/2023 |
| GB | 281721 A | 8/1928 |
| GB | 2418405 A | 3/2006 |
| GB | 2455374 A | 6/2009 |
| GB | 2483881 A | 3/2012 |
| JP | 2002347698 A | 12/2002 |
| JP | 2014119828 A | 6/2014 |
| JP | 2019181965 A | 10/2019 |
| JP | 2020033000 A | 3/2020 |
| JP | 2020131779 A | 8/2020 |
| KR | 20120060590 A | 6/2012 |
| KR | 101784372 B1 | 9/2017 |
| KR | 20170111921 A | 10/2017 |
| KR | 20180069594 A | 6/2018 |
| KR | 101884902 B1 | 8/2018 |
| KR | 101894409 B1 | 9/2018 |
| KR | 102025687 B1 | 9/2019 |
| WO | 2016089882 A1 | 6/2016 |
| WO | 2016164280 A1 | 10/2016 |
| WO | 2017035593 A1 | 3/2017 |
| WO | 2017081668 A1 | 5/2017 |
| WO | 2020191489 A1 | 10/2020 |
| WO | 2022125132 A1 | 6/2022 |
| WO | 2022139864 A1 | 6/2022 |
| WO | 2022150833 A1 | 7/2022 |
| WO | 2022159951 A1 | 7/2022 |
| WO | 2022198225 | 9/2022 |

OTHER PUBLICATIONS

International Search Report and Written Opinion for International Application No. PCT/US2021/028467, Search completed Sep. 9, 2021, dated Sep. 10, 2021, 8 Pgs.
International Search Report and Written Opinion for International Application No. PCT/US2021/028483, Search completed Sep. 17, 2021, dated Sep. 17, 2021, 8 Pgs.
International Search Report and Written Opinion for International Application No. PCT/US2022/070255, Search completed May 10, 2022, dated May 10, 2022, 8 Pgs.
"EVTOLS transportation of the future?", Xplane.org, General Discussion, Jul. 28, 2017, Retrieved from the Internet https://forums.x-plane.org/index.php?/forums/topic/126735-evtols-transportation-of-the-future/&page=6.
"Must quadcopters have the same propeller sizes?", Aviation, Oct. 21, 2018, Retrieved from the Internet https://aviation.stackexchange.com/questions/56237/must-quadcopters-have-the-same-propeller-sizes.
"Why aren't there more manned quad copter designs?", Mavic Pilots, Mar. 10, 2017, Retrieved from the Internet https://mavicpilots.com/threads/why-arent-there-more-manned-quad-copter-designs.10077/page-2.
Du, "Pentacopter build log", DYI Drones, Jul. 20, 2018, Retrieved from the Internet https://diydrones.com/profiles/blogs/pentacopter-build-log.
Lenski, "Design, Construction and Operation of a Pentacopter", Thesis, Luleå University of Technology, Department of Computer Science, Electrical and Space Engineering, Mar. 2017, 84 pgs.
Lillian, "A Bunnycopter and Pentacopter? MIT Lets You Create Whatever Drone You Want", Unmanned Aerial, Dec. 5, 2016, Retrieved from the Internet https://unmanned-aerial.com/a-bunnycopter-and-pentacopter-mit-lets-you-create-whatever-drone-you-want.
Mohamed et al., "Design and Control of Novel Tri-rotor UAV", IEE Proceedings of 2012 UKACC International Conference on Control, Sep. 3-5, 2012, DOI: 10.1109/CONTROL.2012.6334647.

(56) References Cited

OTHER PUBLICATIONS

Yumurtaci, "Help with Differential Thrust for a VTOL", ArduPilot, May 2020, Retrieved from the Internet https://discuss.ardupilot.org/t/help-with-differential-thrust-for-a-vtol/56029.
Saied et al., Fault diagnosis and fault-tolerant control strategy for rotor failure in an octorotor; IEEE International Conference on Robotics and Automation, May 26-30, 2015, pp. 5266-5271, doi: 10.1109/ICRA.2015.7139933.
Sheldahl et al., Aerodynamic characteristics of seven symmetrical airfoil sections through 180-degree angle of attack for use in aerodynamic analysis of vertical axis wind turbines; Sandia National Labs., Albuquerque, NM (USA), Technical Report, 1981, doi: 10.2172/6548367.
Shepperd, Quaternion from rotation matrix.[four-parameter representation of coordinate transformation matrix],; Journal of Guidance and Control, Jun. 1, 1978, vol. 1, pp. 223-224.
Stone et al., Flight testing of the t-wing tail-sitter unmanned air vehicle; Journal of Aircraft, Mar.-Apr. 2008, vol. 45, No. 2, pp. 673-685, doi: 10.2514/1.32750.
Tayebi et al., Attitude stabilization of a vtol quadrotor aircraft; IEEE Transactions on control systems technology, Apr. 24, 2016, vol. 14, No. 3, pp. 562-571, doi: 10.1109/TCST.2006.872519.
Tomic et al., Toward a fully autonomous uav: Research platform for indoor and outdoor urban search and rescue; IEEE Robotics Automation Magazine, Sep. 4, 2012, vol. 19, No. 3, No. 46-56, doi: 10.1109/MRA.2012.2206473.
Veismann et al., Autonomous Flying Ambulance Aerodynamic Characterization; Analysis Report, California Institute of Technology, Aug. 9, 2018, 20 pgs.
Wick, Study of the subsonic forces and moments on an inclined plate of infinite span; National Advisory Committee for Aeronautics, Technical Note 3221, Jun. 1954, 26 pgs.
Zhang et al., A controllable flying vehicle with a single moving part; IEEE International Conference on Robotics and Automation, May 16-21, 2016, pp. 3275-3281, doi: 10.1109/ICRA.2016.7487499.
International Preliminary Report on Patentbility for International Application No. PCT/US2022/070255, dated Aug. 3, 2023, 6 Pgs.
"Fully Mobile, Always Adaptable: Kinetic Mesh Wireless Mesh Networks", Rajant Corporation, Aug. 16, 2018, Retrieved from the Internet https://rajant.com/technology/rajant-kinetic-wireless-mesh-networks/ on Dec. 22, 2021.
Achtelik et al., Design of a multi rotor mav with regard to efficiency, dynamics and redundancy; AIAA Guidance, Navigation, and Control Conference, Aug. 13-16, AIA 2012-4779, pp. 1-17, doi: doi.org/10.2514/6.2012-4779.
Alwi et al., Fault tolerant control of an octorotor using Ipv based sliding mode control allocation; American Control Conference, Jun. 17-19, 2013, pp. 6505-6510, doi: 10.1109/ACC.2013.6580859.
Bandyopadhyay et al., Nonlinear attitude control of spacecraft with a large captured object; Journal of Guidance, Control, and Dynamics, Apr. 4, 2016, vol. 39, No. 4, pp. 754-769, doi: 10.2514/1.G001341.
Bry et al., Aggressive flight of fixed-wing and quadrotor aircraft in dense indoor environments; The International Journal of Robotics Research, Mar. 20, 2015, vol. 34, No. 7, pp. 969-1002, doi: 10.1177/0278364914558129.
Choi et al., Optimization of Multi-Package Drone Deliveries Considering Battery Capacity; Presentation at the 2017 TRB 96 27th Annual Meeting, 2016, Optimization of Multi-Package Drone Deliveries Considering Battery Capacity, 16 pgs.
Chowdhury et al., Back-stepping control strategy for stabilization of a tilt-rotor uav; 24th Chinese Control and Decision Conference, May 23-25, 2012, pp. 3475-3480, doi: 10.1109/CCDC.2012.6244555.
Chung et al., Autonomous Flying Ambulance; Aerospace Robotics and Control at Caltech, Sep. 1, 2018, aerospacerobotics.caltech.edu/urban-air-mobility-and-autonomous-flying-cars/, 8 pgs.
Crowther et al., Kinematic analysis and control design for a nonplanar multirotor vehicle; Journal of Guidance, Control, and Dynamics, Jul.-Aug. 2011, vol. 34, No. 4, pp. 1157-1171, doi: 10.2514/1.51186.
Du et al., Controllability Analysis and Degraded Control for a Class of Hexacopters Subject to Rotor Failures; Journal of Intelligent & Robotic Systems, 2015, vol. 78, No. 1, pp. 143-157, doi: 10.1007/s10846-014-0103-0.
Efraim et al., Quadrotor with a dihedral angle: on the effects of tilting the rotors inwards; Journal of Intelligent & Robotic Systems, Jan. 2, 2015, vol. 80, No. 2, pp. 313-324, doi: 10.1007/s10846-015-0176-4.
Enns, Control allocation approaches; "Guidance, Navigation, and Control Conference and Exhibit, 1998, pp. 98-108, doi: 10.2514/6.1998-4109."
Extended European Search Report for European Application No. 18864524.6, Search completed May 14, 2021, dated May 21, 2021, 11 Pgs.
Falconi et al., Adaptive fault tolerant control allocation for a hexacopter system; American Control Conference, Jul. 6-8, 2016, pp. 6760-6766, doi: 10.1109/ACC.2016.7526736.
Floreano et al., Science, technology and the future of small autonomous drones; Nature, May 28, 2015, vol. 521, pp. 460-466, doi: 10.1038/nature14542.
Frank et al., Hover, transition, and level flight control design for a single-propeller indoor airplane; AIAA Guidance, Navigation and Control Conference and Exhibit, Aug. 20-23, 2007, doi: https://doi.org/10.2514/6.2007-6318.
GALCIT AFA; Sep. 18, 2018, 3 pgs.
Giribet et al., Analysis and design of a tilted rotor hexacopter for fault tolerance; IEEE Transactions on Aerospace and Electronic Systems, Aug. 2016, vol. 52, No. 4, pp. 1555-1567, doi: 10.1109/TAES.2016.140885.
Hauser et al., Aggressive flight maneuvers; Proceedings of the 36th IEEE Conference on Decision and Control, Dec. 12, 1997, vol. 5, pp. 4186-4191, doi: 10.1109/CDC.1997.649490.
Hermann et al., Nonlinear Controllability and Observability; IEEE Transactions on Automatic Control, Oct. 1977, vol. AC-22, No. 5, pp. 728-740, doi: 10.1109/TAC.1977.1101601.
Holden et al., Uber elevate: Fast-forwarding to a future of on-demand urban air transportation; Uber, Tech. Rep., Oct. 27, 2016, 98 pgs.
Hua et al., A control approach for thrust-propelled underactuated vehicles and its application to vtol drones; IEEE Transactions on Automatic Control, Jul. 24, 2009, vol. 54, No. 8, pp. 1837-1853, doi: 10.1109/TAC.2009.2024569.
International Preliminary Report on Patentability for International Application No. PCT/US2018/054017, dated Apr. 8, 2020, dated Apr. 16, 2020, 12 pgs.
International Preliminary Report on Patentability for International Application No. PCT/US2022/07055, dated Aug. 3, 2023, 6 pages.
International Search Report and Written Opinion for International Application No. PCT/US2018/054017, Search completed Jan. 31, 2019, dated Jan. 31, 2019, 17 pgs.
International Search Report and Written Opinion for International Application No. PCT/US2022/070079, Search completed May 3, 2022, dated May 3, 2022, 7 Pgs.
Johansen et al., Control allocation a survey; Automatica, May 2013, vol. 49, No. 5, pp. 1087-1103, doi: 10.1016/j.automatica.2013.01.035.
Kalman et al., Contributions to the Theory of Optimal Control; Bol. Soc. Mat. Mexicana, 1960, vol. 5, No. 2, pp. 102-119.
Kaufman et al., Design and Development of a Free-Floating Hexrotor UAV for 6-DOF Maneuvers; IEEE Aerospace Conference, Mar. 1-8, 2014, pp. 1-10, doi: 10.1109/AERO.2014.6836427.
Klumpp; Singularity-free extraction of a quaternion from a direction-cosine matrix; Journal of spacecraft and rockets, Feb. 17, 1976, vol. 13, No. 12, pp. 754-755, doi: 10.2514/3.27947.
Lanzon et al., Flight control of a quadrotor vehicle subsequent to a rotor failure; Journal of Guidance, Control, and Dynamics, Feb. 12, 2014, vol. 37, No. 2, pp. 580-591, doi: 10.2514/1.59869.
Lee et al., Fault Tolerant Control of Hexacopter for Actuator Faults using Time Delay Control Method; International Journal of Aero-

(56) References Cited

OTHER PUBLICATIONS nautical and Space Sciences, Jan. 14, 2016, vol. 17, No. 1, pp. 54-63, doi: 10.5139/IJASS.2016.17.1.54.
Lee, Exponential stability of an attitude tracking control system on so (3) for large-angle rotational maneuvers; Systems & Control Letters, Jan. 2012, vol. 61, No. 1, pp. 231-237, doi: 10.1016/j.sysconle.2011.10.017.
Markforged, Markforged Materials, Sep. 28, 2018, markforged.com/materials/#onyx, 7 pgs.
Meier et al., Pixhawk: A micro aerial vehicle design for autonomous flight using onboard computer vision; Autonomous Robots, Aug. 2012, vol. 33, No. 1-2, pp. 21-39, doi: 10.1007/s10514-012-9281-4.
Mellinger et al., Minimum snap trajectory generation and control for quadrotors; IEEE International Conference on Robotics and Automation, May 9-13, 2011, pp. 2520-2525, doi: 10.1109/ICRA.2011.5980409.
Menon et al., Nonlinear flight test trajectory controllers for aircraft; Journal of Guidance, Control, and Dynamics, Jan.-Feb. 1987, vol. 10, No. 1, pp. 67-72, doi: doi.org/10.2514/3.20182.
Michieletto et al., Control of statically hoverable multi-rotor aerial vehicles and application to rotor-failure robustness for hexarotors; IEEE International Conference on Robotics and Automation, May 29-Jun. 3, 2017, pp. 2747-2752, doi: 10.1109/ICRA.2017.7989320.
Mueller et al., Stability and control of a quadrocopter despite the complete loss of one, two, or three propellers; Robotics and Automation, IEEE International Conference, May 31-Jun. 7, 2014, pp. 45-52, doi: 10.1109/ICRA.2014.6906588.
Murray et al., The flying sidekick traveling salesman problem: Optimization of drone-assisted parcel delivery; Transportation Research Part C: Emerging Technologies, Mar. 2015, vol. 54, pp. 86-109, doi: 10.1016/j.trc.2015.03.005.
Oosedo et al., Optimal transition from hovering to level-flight of a quadrotor tail-sitter uav; Autonomous Robots, 2017, First Published Jul. 25, 2016, vol. 41, No. 5, pp. 1143-1159, doi: 10.1007/s10514-016-9599-4.
Papachristos et al., Model predictive attitude control of an unmanned tilt-rotor aircraft; Industrial Electronics, IEEE International Symposium on Jun. 27-30, 2011, pp. 922-927, doi: 10.1109/ISIE.2011.5984282.
Park et al., Fault tolerant flight control system for the tilt-rotor uav; Journal of the Franklin Institute, Nov. 2013, vol. 350, No. 9, pp. 2535-2559, doi: 10.1016/j.jfranklin.2013.01.014.
Perez et al., A ground control station for a multi-uav surveillance system; Journal of Intelligent & Robotic Systems, vol. 69, No. 1, Jan. 2013, pp. 119-130, doi: 10.1007/s10846-012-9759-5.
Renuke, Dynamic Analysis of a Car Chassis; International Journal of Engineering Research and Applications, vol. 2, No. 6, Nov.-Dec. 2012, pp. 955-959.
Ritz et al., A global controller for flying wing tailsitter vehicles; IEEE International Conference on Robotics and Automation, May 29-Jun. 3, 2017, pp. 2731-2738, doi: 10.1109/ICRA.2017.7989318.
Rogers, Propeller Efficiency Rule of Thumb; NAR Associates, 2010, 5 pgs.
Ryll et al., A novel overactuated quadrotor unmanned aerial vehicle: Modeling, control, and experimental validation; IEEE Transactions on Control Systems Technology, Nov.-Dec. 2012, Jul. 30, 2014, vol. 23, No. 2, pp. 540-556, doi: 10.1109/TCST.2014.2330999.
Ryll et al., Modeling and control of fast-hex: A fully-actuated by synchronizedtilting hexarotor; IEEE/RSJ International Conference on Intelligent Robots and Systems, Oct. 9-14, 2016, pp. 1689-1694, doi: 10.1109/IROS.2016.7759271.
Rysdyk et al., Adaptive model inversion flight control for tilt-rotor aircraft; Journal of guidance, control, and dynamics, May-Jun. 1999, vol. 22, No. 3, pp. 402-407, doi: 10.2514/2.4411.
International Preliminary Report on Patentability for International Application No. PCT/US2022/071201, Report dated Sep. 12, 2023, dated Sep. 28, 2023, 06 Pgs.
International Preliminary Report on Patentability for International Application PCT/US2021/028467, Report dated Jun. 13, 2023, dated Jun. 22, 2023, 05 Pgs.
International Preliminary Report on Patentability for International Application PCT/US2021/028483, Report dated Jun. 13, 2023, dated Jul. 6, 2023, 06 Pgs.

\* cited by examiner

SYSTEMS FOR FLIGHT CONTROL ON A MULTI-ROTOR AIRCRAFT

CROSS-REFERENCED APPLICATIONS

This application claims priority to U.S. Provisional applications 63/124,614 filed on Dec. 11, 2020 and 63/129,144 filed on Dec. 22, 2020. The disclosures of which are included herein by reference in their entirety.

FIELD OF THE INVENTION

The present invention generally relates to multi-rotor aircraft. More specifically, it relates to the configuration and control of the various rotors in order to provide a stable and efficient control methodology.

BACKGROUND

Most Vertical Takeoff and Landing (VTOL) vehicles are multi-copter vehicles having a number of different rotors. Typical VTOL systems have multiple fixed-pitch rotors that work to produce the forces necessary for flight; which include lift, thrust, and side movement, as well as roll, pitch, and yaw. Traditionally, for a multi-rotor copter VTOL the rotors are similar to an airplane propeller and is configured in the horizontal plane. This configuration generally provides the lift force necessary to lift the aircraft into the air for flight. The configuration of rotors or propellers can also be used to provide thrust forces at speeds that are generally below those needed for a fixed winged aircraft, where the wing can provide lift when moving at higher speeds. The forward thrust in a VTOL is typically managed by the control or change in rotational speed (RPM) of the various rotors. This can be done by varying the speed of one or more rotors to drive the direction of the vehicle by changing the thrust generated by the rotors.

The vast majority of drones and VTOL tend to be a quad copter design with four rotors. This is largely due to the inherent stability that a quad copter offers. The balanced configuration of rotors combined with counter rotation of adjacent rotors can make for a very stable design. Additionally, small changes to the speeds of the rotors can allow for relatively precise vehicle control. For example, reducing speed on all four rotors can allow for a smooth decent. Likewise, changes in speed of the aft two rotors can cause forward flight and the opposite is true for change in the forward two rotors. Similarly, the moment controls of roll, pitch, and yaw can be adjusted through changing speeds in the various rotors. Accordingly, flight control systems can be largely simplified making the quad copter an easy, go to design for VTOL. However, many such traditional designs can create issues in scalability, especially when trying to manage the various movements and moments of the aircraft.

SUMMARY OF THE INVENTION

Many embodiments are directed to a multi-rotor vehicle that has an odd number of rotors. In many embodiments, there are an even number of main rotors that operate to provide lift for the vehicle and the odd auxiliary rotor provides less lift than the main rotors. In various embodiments the unbalanced torque from the auxiliary rotor is counterbalanced from a pair of horizontal thrust rotors that are also configured to provide yaw control.

Many embodiments include a multi-rotor vehicle that has a body structure and a plurality of main rotors connected to the body structure and evenly disposed about a symmetry plane of the vehicle. The vehicle also has an auxiliary rotor connected to the body structure and disposed forward of the plurality of main rotors along the symmetry plane, wherein the auxiliary rotor is configured to be smaller than each of the plurality of main rotors. Additionally, many embodiments have at least two thrust rotors connected to the body structure and evenly disposed about the symmetry plane and configured to generate thrust and/or yaw control for the vehicle such that a rotational plane of the thrust rotors is perpendicular to a rotational plane of the main rotors.

In other embodiments, the body structure is a plurality of elongated structural support elements and disposed such that at least one structural support element interconnects at least two main rotors and additional structural support elements interconnect the main rotors to the auxiliary rotor.

In still other embodiments, the at least two thrust rotors are disposed on a first and second end of a transecting structural element, wherein the transecting structural support element transects at least two elongated structural support elements of the body structure.

In yet other embodiments, the at least two thrust rotors are positioned aft of the main rotors.

In still yet other embodiments, the at least two thrust rotors are positioned forward of the main rotors but aft of the auxiliary rotor.

In other embodiments, the at least two thrust rotors are positioned between at least two sets of main rotors.

In still other embodiments, the vehicle has a shroud, wherein the shroud surrounds at least a portion of the main rotors and the auxiliary rotors of the vehicle.

In yet other embodiments, each of the main rotors, auxiliary rotor, and the at least two thrust rotors are selected from a group consisting of fixed pitch and variable pitch.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

DESCRIPTION OF THE DRAWINGS

The description will be more fully understood with reference to the following figures, which are presented as exemplary embodiments of the invention and should not be construed as a complete recitation of the scope of the invention, wherein.

DETAILED DESCRIPTION

Turning now to the drawings, systems and methods for improving flight control are illustrated. Many embodiments are directed to a vehicle designed with an odd number of rotors designed to generate an amount of lift for the vehicle. As can be appreciated the odd number of rotors presents a challenge of unbalanced torque on the system. As such, many embodiments may incorporate a smaller more forward positioned rotor that can alleviate the pitching moment on the vehicle while providing additional lifting properties. Additionally, many embodiments incorporate two or more thrust rotors positioned at a 90-degree angle from the main lifting rotors where the thrust rotors are configured to provide forward thrust to the vehicle. Additionally, the thrust rotors can function to provide improved yaw control in the vehicle.

Figure 1:
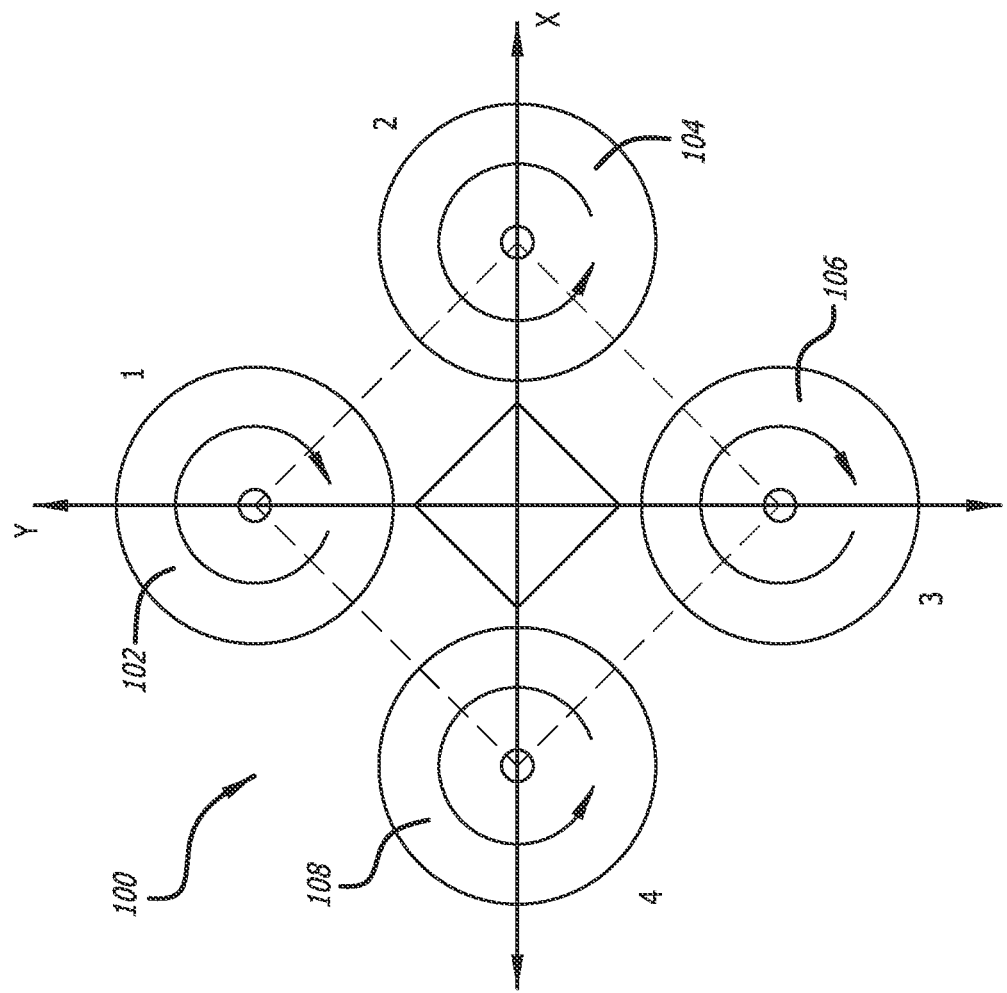
FIG. 1 illustrates a traditional quad copter configuration consistent with known art.

Conventional VTOL and copter type drones tend to use a fixed-pitch approach to rotors. The fixed-pitch approach requires that the rotors be of equal size. As previously mentioned, the conventional flight control is managed through the acceleration/deceleration of one or more of the rotors. For example, FIG. 1 illustrates a conventional layout of a quadcopter 100 with individual rotors 102-108. As can be seen, each of the adjacent rotors are configured to rotate in opposing directions to help balance the torque generated by the rotor. Because all of the rotors are of equal size control methodologies can create various problems. For example, the desired change in moments (roll, pitch, yaw) entails a change in forces (lift, thrust, side force) which can require non-linear relationships that require control software to implicitly decouple the moments from the forces to allow for accurate control of the vehicle. Additionally, more conventional designs inherently account for the torque generated by the rotors by providing an equal and opposite rotor to counter the torque generated.

Some conventional systems also utilize alternative anti-torque mechanisms such as a tail or a complex software that blends commands to other rotors. This results in a complex highly coupled flight control system. By coupled, we are referring to the coupling between rotors and the control of the rotors to generate the movement and moment forces. Furthermore, due to the complexity and coupling of the movements, the control bandwidth is limited by the rate of acceleration/deceleration of the subject rotors. As the vehicle size increases, the control bandwidth become untenably small. Accordingly, scalability can be limited with more traditional designs creating more complexity in control and design configuration.

The general equation for an aircraft fast-mode (for example, short-period mode) natural frequency, $\omega_n^2$, is:

$$\omega_n^2 = \frac{-0.5\rho V^2 ScC_{M_\alpha}}{I}$$

Where $0.5\rho V^2$ is the dynamic pressure, S is the reference area, c is the reference length-scale, $C_{M_\alpha}$ Is the aircraft pitch stiffness, and I is the aircraft moment of inertia concerning the relevant axis. The moment of inertia varies as the fifth power of a length scale. If the linear aircraft dimension is doubled, the moment of inertia increases by a factor of 32. Concomitantly the linear dimension of every rotor is doubled, and every respective rotor's moment of inertia also increases by a factor of 32. Linear dimension rises, of course, only linearly, and the area is quadratic. Assume that dynamic pressure is unaffected, for example, because it is referenced off of rotor tip speed, and tip speed is kept invariant with scale. Thus, the natural frequency of the aircraft, if the scale is doubled, is halved. But the rotor moment of inertia goes up by 32, the bandwidth of the control system is reduced by a factor of 32. This makes the control system 16 times slower, relative to the new natural frequency.

In contrast, many embodiments allow for improved scalability and flight control through an unconventional approach to vehicle design. Such embodiments allow for the decoupling of the moments and movements of the rotors that can subsequently allow for more efficient control of the aircraft. IN accordance the numerous embodiments, an aircraft can be configured with an odd number of rotors with a forward positioned rotor that has a smaller disk-area than the additional rotors. The smaller disk-area of the odd rotor can help to decouple the controls by reducing the moment pitch coupling with the change in total aircraft lift. Additionally, a smaller disk-area on a front rotor can mean less unbalanced torque from the odd rotor. Furthermore, a reduced front rotor can allow for a number of vehicle configurations that would help to improve the flight characteristics of the overall vehicle such as shrouding.

Figure 2:
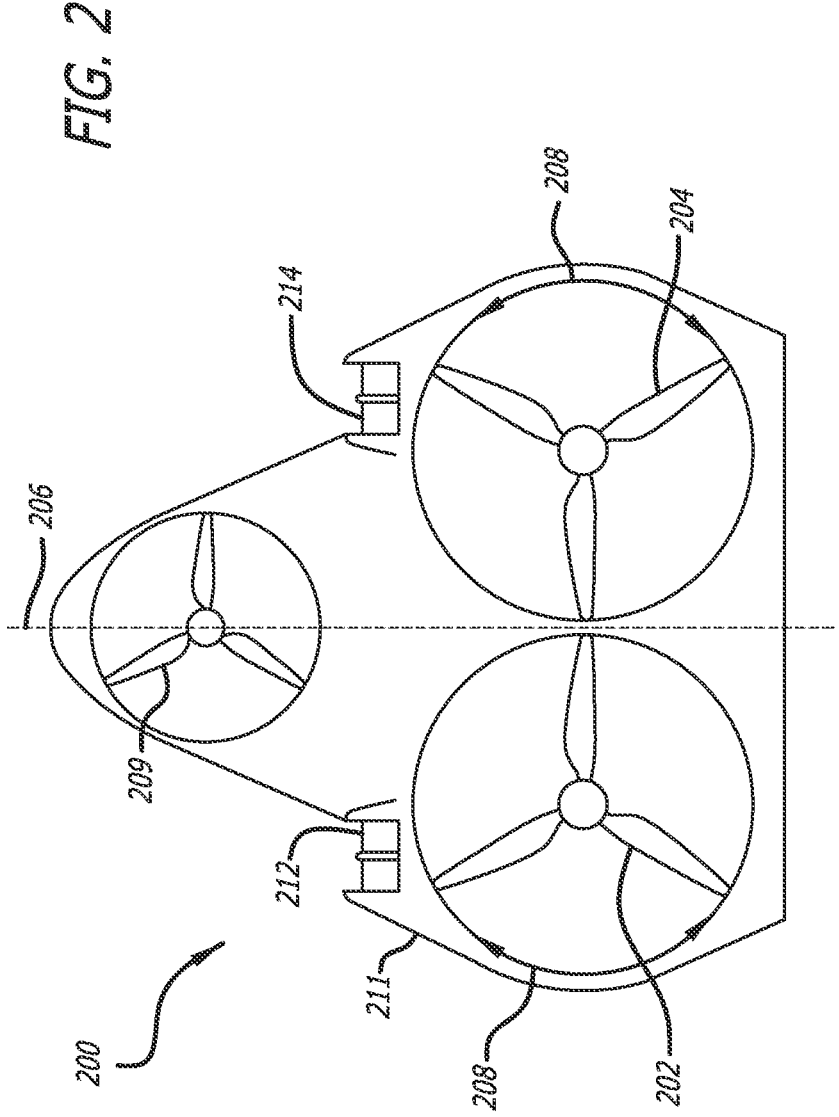
FIG. 2 illustrates a tri-copter configuration with a rotor body shroud in accordance with embodiments of the invention.

Referring to FIG. 2, an embodiment of a multi-rotor aircraft 200 can be seen. Some vehicles may be configured with two main rotors 202 and 204 that are positioned opposite each other across a symmetry plane 206 of the vehicle. As illustrated by the directional arrows 208, each of the two main rotors can rotate in either direction and opposing directions to cancel the relative torque generated by each of the rotors. Thus, eliminating an unbalanced rolling torque during flight. As can be appreciated, the pitch settings of each of the two main rotors can affect the overall pitch of the vehicle. Accordingly, if the pitch settings are identical there will be no unbalanced yawing torque from the main rotors during flight.

In accordance with many embodiments, the multi-rotor vehicle 200 can have an odd numbered auxiliary rotor 209 positioned near the front of the vehicle 200. Conventional wisdom would avoid the use of an odd number of rotors due to the unbalanced torque that an odd number of rotors can create during any flight regime. Additionally, odd number of rotors can create an unstable roll in forward flight. However, in accordance with numerous embodiments, the aircraft 200 can have an odd numbered or auxiliary rotor 209 positioned centered on the aircraft symmetry plane 206. Additionally, many embodiments utilize a rotor with a smaller disk area than the remaining rotors. The position and size of the auxiliary rotor 209 can reduce the amount of unbalanced torque and roll generated by the rotor 209. When considering the fifth power of length scale described above, a reduction in rotor size can drastically reduce the unbalanced torque that is naturally generated by the spinning of the rotor. For example, when the auxiliary rotor is 20% smaller than the main rotors the loss in lifting area is only 12% while the unbalanced torque is reduced by 67%. This reduction in unbalanced forces can be largely beneficial for the remaining rotors and any additional rotors on the aircraft because it can reduce the amount of work each of the additional rotors require to overcome the unbalanced forces. All the while the auxiliary rotor can help to provide lift as well as generate a pitch moment when needed. Effectively, the use of an auxiliary odd numbered rotor with a smaller disk area than the main rotors can help to decouple the movement control between the various rotors. Although the auxiliary rotor is shown in a given position with respect to the main rotors, it can be appreciated that many embodiments may position the rotor 209 at any longitudinal location to best trim the aircraft pitch, meet the constraints of compactness and/or accommodate an aerodynamic shroud 211.

As the aircraft with odd numbered rotors may still produce some unbalanced torque, some embodiment may implement the use of multiple thrust control rotors (212 and 214) to cancel any remaining torque and roll that might generate undesirable flight conditions. Many embodiments may position the thrust control rotors (212 and 214) outboard of the symmetry plane 206 and on opposite sides of the aircraft 200. As a result of the smaller auxiliary rotor 209 producing much less unbalanced torque and roll, the thrust control rotors can be positioned closer to the symmetry plane 206 of the aircraft 200 in some embodiments. There are a number of advantages of using a smaller auxiliary rotor in combination with thrust rotors (212 and 214). For example, the decoupling of control dynamics can allow for the thrust rotors (212 and 214) to be used for ultimate or augmented yaw control. As one rotor adjusts its speed and/or direction, the yaw of the vehicle 200 can be adjusted with little effort. Therefore, the thrust rotors (212 and 214) would not need to be large as compared to the main rotors or auxiliary rotor 209. Although two thrust rotors are shown, it should be understood that various embodiments may use more than two thrust rotors. As can be appreciated, the thrust rotors (212 and 214) illustrated throughout can perform a number of simultaneous functions such as cancelling the yawing-torque from the unbalanced auxiliary rotor, providing a yawing moment to control the yaw of the vehicle, and provide forward and rearward thrust for the whole of the vehicle. Therefore, the thrust rotors can serve a number of different purposes that aid in providing a more stable flight control system.

Figure 3:
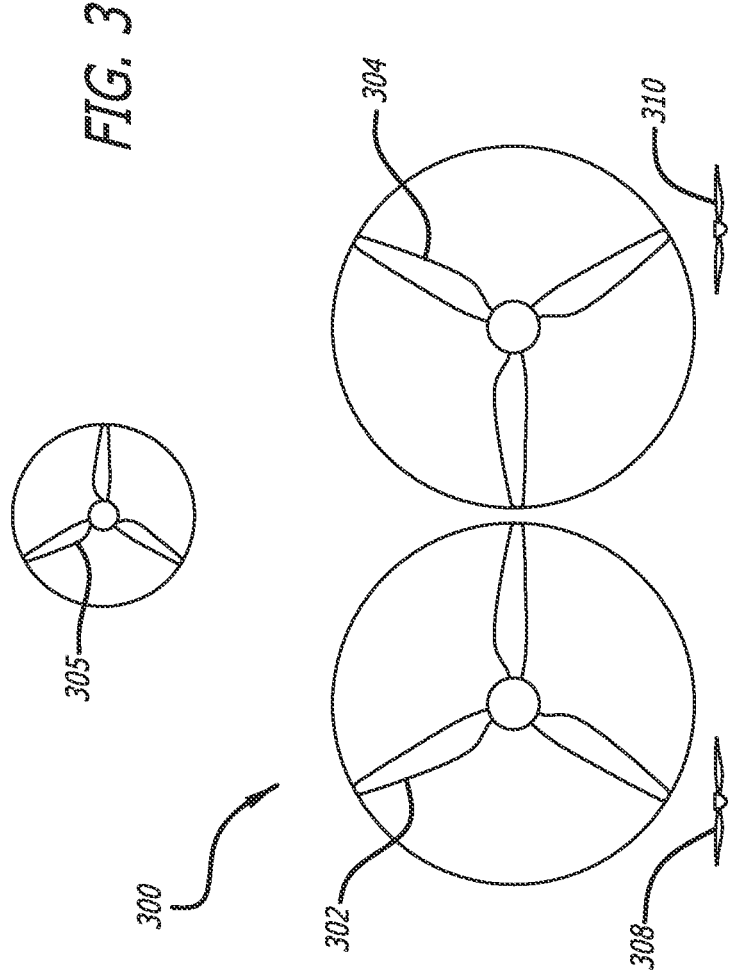
FIG. 3 illustrates a tri-copter configuration with aft positioned yaw/thrust rotors in accordance with embodiments of the invention.
Figure 4:
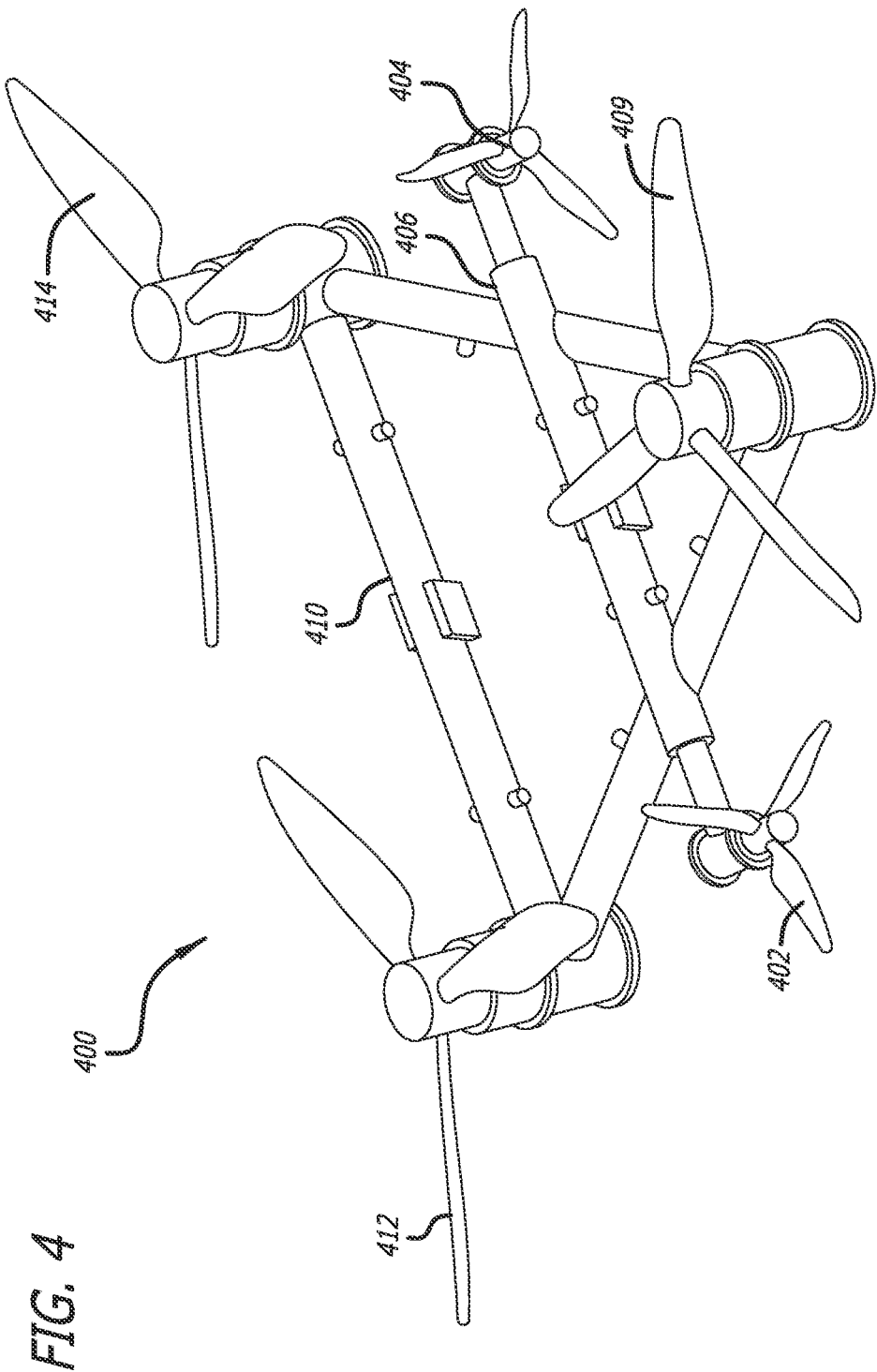
FIG. 4 illustrates a tri-copter configuration with yaw/thrust rotors positioned near the forward rotor in accordance with embodiments of the invention.

The use of a smaller auxiliary rotor can offer a large variety of design flexibility with respect to the main rotors and/or the thrust rotors. For example, FIG. 3 illustrates a planar layout of an aircraft rotor configuration 300 with two main rotors (302 and 304) and one auxiliary rotor 305. Given the advantages discussed above, some embodiments may position a set of thrust rotors (308 and 310) aft of the main rotors (302 and 304). Furthermore, FIG. 4 illustrates an embodiment of an aircraft 400 where the thrust rotors (402 and 404) are positioned along a support shaft 406 that is located much closer to the forward most auxiliary rotor 409. The support shaft 406 can be located on a skeletal frame structure 410 that also acts to support the main rotors (412 and 414) as well as the auxiliary rotor 409. It can be appreciated that designs can be simple and/or complex and still allow for a decoupled control approach. Although FIGS. 2-4 illustrate air craft designs that generally represent tri-rotor designs with equally spaced rotors, it can be appreciated that embodiments of a tri-rotor design can be any configuration rotors.

Figure 5:
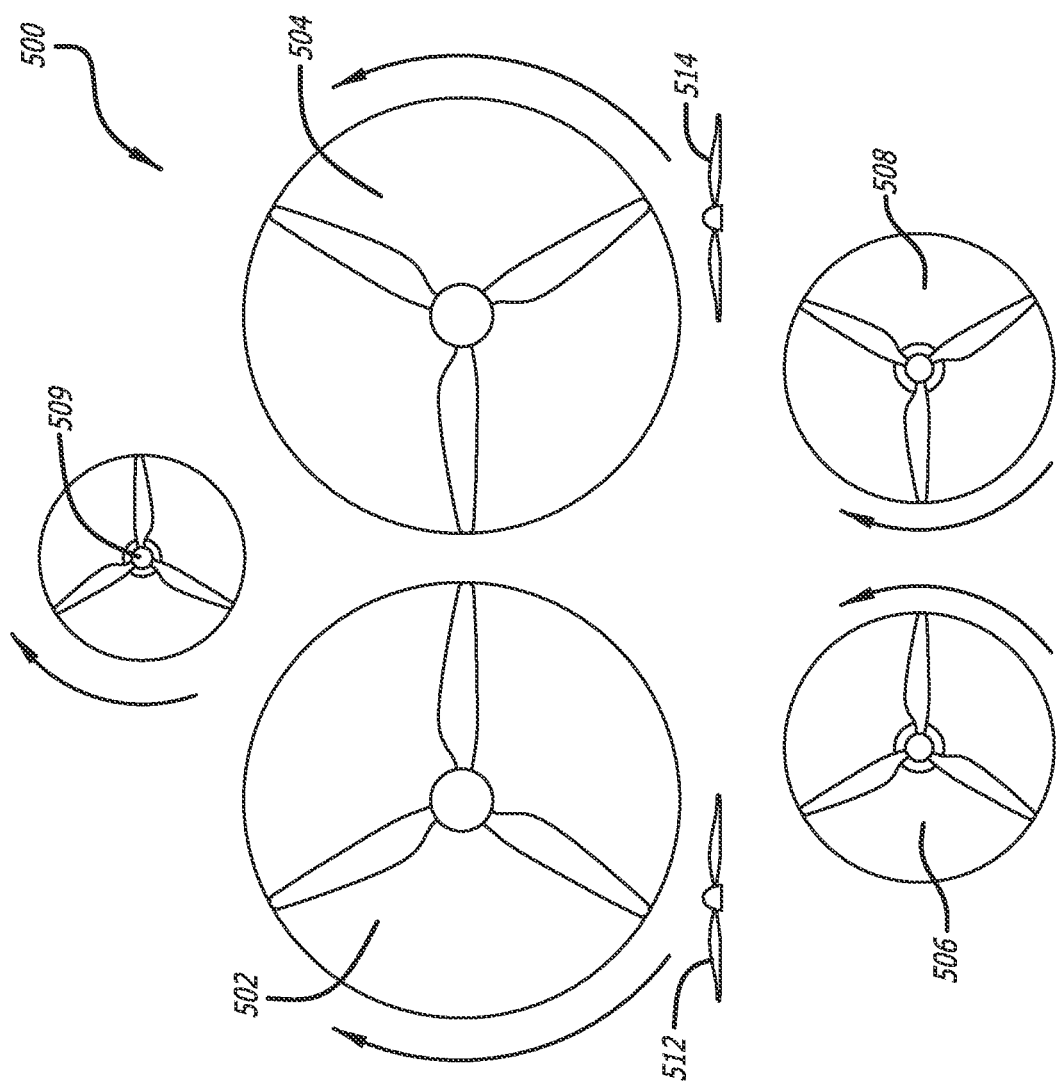
FIG. 5 illustrates a multi-rotor configuration in accordance with embodiments of the invention.

Additionally, FIG. 5 illustrates the expandability of many designs based on the principles of operation discussed herein. For example, some embodiments may incorporate a penta-rotor designed aircraft 500 with two main rotors (502 and 504) that are in counter rotation. There may also be two secondary rotors (506 and 508) also in counter rotation. Finally, the penta-rotor design 500 would be equipped with an unbalanced torque fifth rotor 509. The fifth rotor 509 would be responsible for producing a pitching moment based on collective blade-pitch and/or rotational speed similar to other embodiments with an odd number of rotors. It can be appreciated that any of the given rotors can be configured with variable pitch as well as a collective blade-pitch to help control the pitch of the vehicle in conjunction with the auxiliary rotor 509. Likewise, and similar to other embodiments, a penta-copter may incorporate a number of thrust rotors 512 and 514 to provide the additional balance in torque, roll, and yaw control for the vehicle.

Although the primary principle of operation is to improve control characteristics of a vehicle through unconventional design layouts with decoupling of movement controls, many embodiments may implement a variety of other control measures to help improve the overall control of the vehicle. For example, in a number of embodiments each of the rotors can have a fixed pitch or a variable pitch. The variable pitch of the individual rotors can help improve the overall flight characteristics in a number of ways. For example, the thrust rotors can utilize variable pitch to more accurately control the yaw and/or unbalanced torque produced from the auxiliary rotor. Likewise, the main rotors can utilize variable pitch designs to improve lift, thrust, pitch, and/or roll of the vehicle. Therefore, it can be appreciated that any balanced configuration of fixed-pitch and variable pitched rotors can be used to control the movement and moments of the aircraft.

Figure 6:
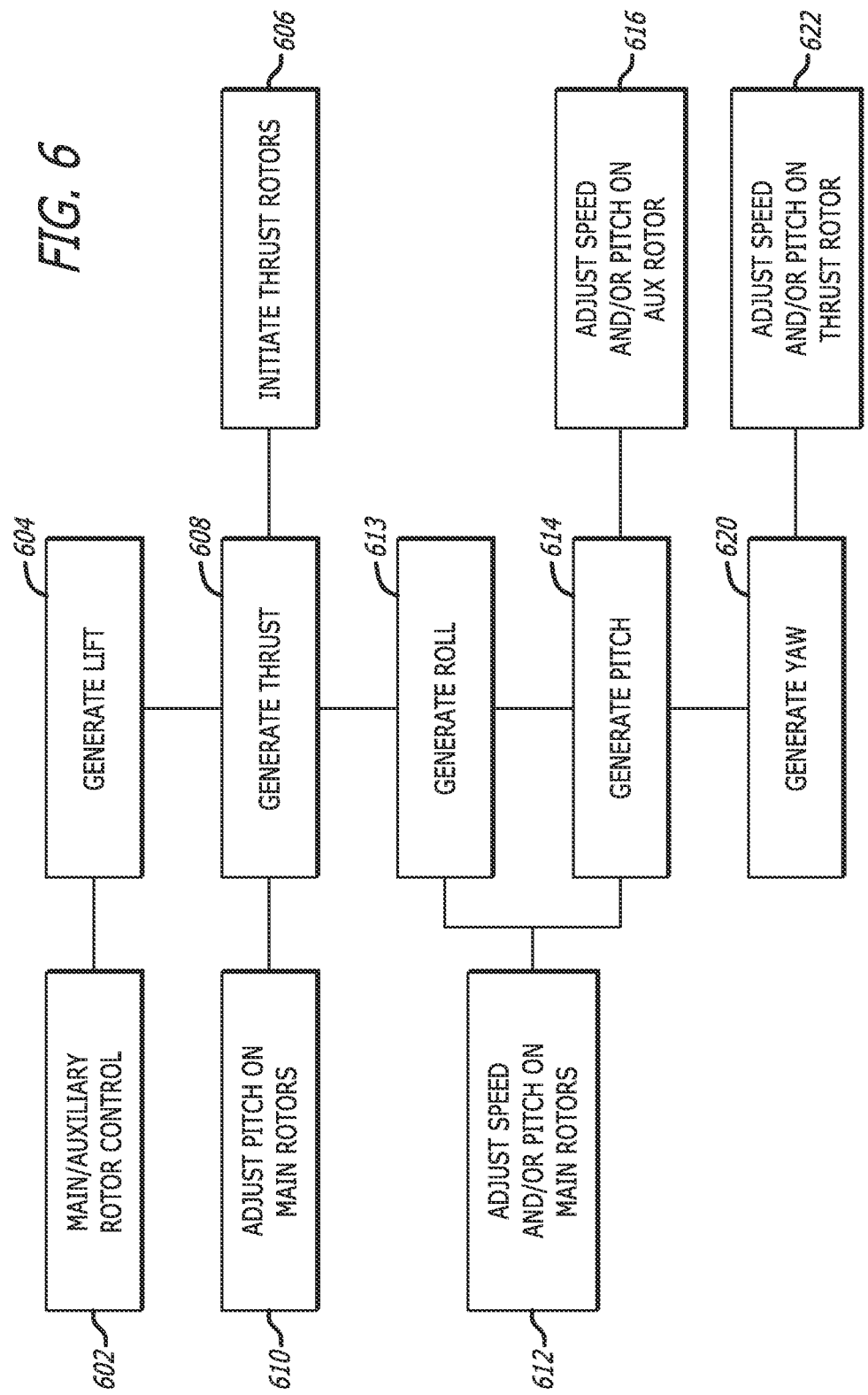
FIG. 6 illustrates a control methodology for yaw control in accordance with embodiments of the invention.

The method of control of a multi-rotor aircraft can vary depending on the desired movement of the vehicle. Accordingly, the various rotors can be moved in a number of combinations to control the aircraft. For example, FIG. 6 illustrates a control methodology for flying an aircraft with fixed and or variable pitch rotors. Generally, the main rotors and auxiliary rotor are spun up (602) to generate lift (604). Subsequently the thrust rotors can be spun up (606) to generate a forward thrust (608). In correlation with the thrust rotors, the main rotors can provide additional forward thrust through a pitch adjustment (610). If flight paths and/or obstacles require the use of a roll technique, the speed and/or pitch of the main rotors can be adjusted (612) to control the roll of the vehicle 613. The pitch of the vehicle can be controlled (614) by either the movement of the auxiliary rotor (616) and/or the movement of the main rotors (612). As can be appreciated in a fixed pitch configuration the speed can be adjusted and in a variable pitch configuration the speed and/or pitch can be adjusted on the various rotors to control the pitch as well as other movements. Similar to the thrust, roll, and pitch, yaw control (620) can be done through the control of the thrust rotors (622). The thrust rotors (622) can adjust the speed and/or pitch to generate a yaw moment in the aircraft and thereby change direction.

Although not fully illustrated, it should be understood that many embodiments can include a number of different elements to help control the movement of the aircraft. For example, many embodiments may use a computer control system that is connected to the various motors/rotors that can adjust determine precise speed and/or pitch of the various rotors to control the vehicle. Likewise, many embodiments may have a number of different mechanical linkages that can help to control or adjust the pitch of the rotors. Additionally, some embodiments may incorporate a number of different shroud designs to encapsulate the various components while others may have an open skeletal structure similar to FIG. 4

SUMMARY & DOCTRINE OF EQUIVALENTS

As can be inferred from the above discussion, the above-mentioned concepts can be implemented in a variety of arrangements in accordance with embodiments of the invention. Specifically, the use of an odd number of rotors with a forward most rotor that is smaller than the main rotors. Additionally, a number of embodiments incorporate additional smaller thrust rotors to generate thrust and/or yaw control of a vehicle.

Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A multi-rotor vehicle comprising:
 a body structure;
 a plurality of main rotors connected to the body structure and evenly disposed about a symmetry plane of the vehicle;
 an auxiliary rotor connected to the body structure and disposed forward of the plurality of main rotors along the symmetry plane, wherein the auxiliary rotor is configured to be smaller than each of the plurality of main rotors; and
 at least two thrust rotors connected to the body structure and evenly disposed about the symmetry plane and configured to generate thrust and/or yaw control for the vehicle such that a rotational plane of the thrust rotors is perpendicular to a rotational plane of the main rotors, wherein a thrust axis of each of the at least two thrust rotors is parallel to the thrust axis of each other thrust rotor;
 wherein the body structure is a plurality of elongated structural support elements and disposed such that at least one structural support element interconnects at least two of the plurality of main rotors and additional structural support elements interconnect the plurality of main rotors to the auxiliary rotor; and
 wherein the at least two thrust rotors are disposed on a first and second end of a transecting structural support element, wherein the transecting structural support element transects at least two of the elongated structural support elements of the body structure.

2. The multi-rotor vehicle of claim 1, wherein the at least two thrust rotors are positioned aft of the plurality of main rotors.

3. The multi-rotor vehicle of claim 1, wherein the at least two thrust rotors are positioned forward of the plurality of main rotors but aft of the auxiliary rotor.

4. The multi-rotor vehicle of claim 1, wherein the at least two thrust rotors are positioned between at least two sets of main rotors.

5. The multi-rotor vehicle of claim 1, further comprising a shroud, wherein the shroud surrounds at least a portion of the plurality of main rotors and the auxiliary rotor of the vehicle.

6. The multi-rotor vehicle of claim 1, wherein each of the plurality of main rotors, the auxiliary rotor, and the at least two thrust rotors are selected from a group consisting of fixed pitch and variable pitch rotors.

* * * * *